United States Patent
Madhani et al.

(10) Patent No.: US 9,436,937 B1
(45) Date of Patent: *Sep. 6, 2016

(54) HIGHLIGHT-BASED BILL PROCESSING

(71) Applicant: INTUIT INC., Mountain View, CA (US)

(72) Inventors: Sunil H. Madhani, Sammamish, WA (US); Anu Sreepathy, Bangalore (IN); Samir R. Kakkar, Bangalore (IN)

(73) Assignee: INTUIT INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/845,075

(22) Filed: Sep. 3, 2015

Related U.S. Application Data

(63) Continuation of application No. 13/598,521, filed on Aug. 29, 2012, now Pat. No. 9,129,197.

(51) Int. Cl.
*G06K 19/06* (2006.01)
*G06Q 20/10* (2012.01)
*G06K 9/00* (2006.01)
*G06K 9/46* (2006.01)

(52) U.S. Cl.
CPC ......... *G06Q 20/102* (2013.01); *G06K 9/00469* (2013.01); *G06K 9/4652* (2013.01)

(58) Field of Classification Search
CPC .............. G06K 2019/06225; G06K 19/06037
USPC ............................... 235/494, 462.04, 462.05
See application file for complete search history.

(56) References Cited

U.S. PATENT DOCUMENTS

| | | | |
|---|---|---|---|
| 5,283,829 A | 2/1994 | Anderson | |
| 5,465,206 A | 11/1995 | Hilt et al. | |
| 6,918,083 B2 | 7/2005 | Smith | |
| 8,391,583 B1 | 3/2013 | Mennie et al. | |
| 9,129,197 B1 * | 9/2015 | Madhani | G06K 19/06037 |
| 2002/0001393 A1 | 1/2002 | Jones et al. | |
| 2002/0023055 A1 | 2/2002 | Antognini et al. | |
| 2002/0156827 A1 | 10/2002 | Lazar | |
| 2004/0122766 A1 | 6/2004 | Brooks et al. | |
| 2005/0065893 A1 | 3/2005 | Josephson | |
| 2012/0078732 A1 | 3/2012 | Heller | |

OTHER PUBLICATIONS https://www.chase.com/online/services/check-deposit.htm.
http://www.premierathome.com/support/Manuals/E%20Text%20Reader%20Manual.pdf.
http://en.wikipedia.org/wiki/Electronic_bill_payment.
http://paytrust.intuit.com/.
https://online.citibank.com/JRS/pands/detail.do?ID=MobileCheckDeposit.
http://en.wikipedia.org/wiki/Fluorescence, last motified Oct. 10, 2014, printed on Oct. 10, 2014 (15 pages).
http://en.wikipedia.org/wiki/Security_thread, last modified Jul. 4, 2014, printed on Oct. 10, 2014 (1 page).

\* cited by examiner

*Primary Examiner* — Daniel St. Cyr
(74) *Attorney, Agent, or Firm* — Vista IP Law Group LLP

(57) ABSTRACT

Document processing utilizing extraneous highlight added to the document. Sections or fields of a document including data utilized for document processing are marked or highlighted for processing. For example, a paper or printed document may be manually highlighted by a highlighter pen, or the highlight may be computer generated. An image of the highlighted bill is acquired. Highlighted sections within the image are identified, and bill data within the highlighted fields is extracted and utilized for bill processing.

34 Claims, 16 Drawing Sheets

HIGHLIGHT-BASED BILL PROCESSING

CROSS-REFERENCE TO RELATED APPLICATION

This application is a continuation of U.S. application Ser. No. 13/598,521 filed on Aug. 29, 2012, entitled HIGHLIGHT-BASED BILL PROCESSING, issued as U.S. Pat. No. 9,129,197 on Sep. 8, 2015, the contents of which are incorporated by reference as though set forth in full.

SUMMARY

Embodiments are directed to processing documents such as bills or invoices utilizing an extraneous highlight or other color-based indicator applied to the document. Embodiments can be applied to documents as generated or received by recipients, copies or reproductions thereof, and electronic versions thereof (e.g., a bill or invoice that is a .pdf document or included in an electronic mail message).

Embodiments are also directed to processing documents such as bills or invoices utilizing a marking instrument such as a highlighter and a mobile communication device. The type of processing may depend on the type of document processed, and processing may involve storing resulting data to database or taking other action such as initiating an electronic bill payment.

Embodiments are also directed to processing documents such as bills or invoices without having to manually enter bill or invoice data, e.g., into an electronic document such a pdf document, document generated with a word processing program, or into a web page form as part of an electronic payment to a merchant or financial institution.

One embodiment is directed to a computer-implemented bill processing method in which a computing apparatus receives an image of a printed bill or hardcopy thereof. The bill includes at least one manually highlighted section and at least one unhighlighted section. Bill data within the manually highlighted section is determined, and the printed bill is processed for electronic payment based at least in part upon the bill data within the highlighted section.

A further embodiment is directed to a computer-implemented bill processing method in which a computing apparatus receives an image of a printed bill that includes extraneous color data. The computing apparatus determines bill data within a section of the bill comprising the extraneous color data and processes the printed bill for electronic payment based at least in part upon the determined bill data.

Yet another embodiment is directed to method for processing a printed bill and involves a payee, recipient or user manually highlighting at least one section of the printed bill and acquiring an image of the manually highlighted paper bill (e.g., using a camera or other image capture device of a mobile communication or computing device), and electronically paying the printed bill based at least in part upon the at least one manually highlighted section.

Further computer-implemented methods involve extraneous data in the form of a computer generated highlight, e.g., generated in response to a user command or the user manipulating an input device of a computing or mobile communication device such as a mouse or touchscreen tap or drag action to manually select and highlight bill data displayed on a screen. In these embodiments, a computing apparatus receives an image of a printed bill that includes at least one highlighted section generated by the computer, and at least one unhighlighted section, determines bill data within the computer highlighted section, and processes the printed bill for electronic payment based at least in part upon the determined bill data.

Additional embodiments involve both manual and computer generated highlights of printed and electronic versions of a bill. For example, in cases in which one or more fields or sections of a printed or hardcopy bill or invoice were manually highlighted, but after the image was acquired, it was determined that additional highlighting was necessary. The partially highlighted section can be resolved by additional highlighting generated or executed by, or utilizing, a computing apparatus. For example, resolution may also be in the form of detecting a partially highlighted section and requesting the user to repeat or complete highlighting of the partially highlighted section. Detection of a partially highlighted section may be based at least in part upon detection of a field or section that normally is a certain shape (e.g., rectangular) and/or dimension, but detection by the bill processing program that highlighting was only applied to part of the rectangle (resulting in an open-ended rectangle).

Further embodiments are directed to articles of manufacture or computer program products comprising non-transitory computer readable storage media having stored thereupon a sequence of instructions which, when executed by a computer, causes the computer to perform process for processing a bill or invoice and involves manually colored or highlighted and/or computer highlighted sections or fields of a bill or invoice. Embodiments may be embodied within media of a computer or a mobile communication device such as a smartphone or tablet computing device, which may also be operable to generate and/or process colored or highlighted bills or invoice.

Further embodiments are directed to systems configured, programmed or operable to implement methods and execute computer program products for processing images of bills or invoices including manual or computer generated colored highlighted sections, other extraneous color data or other markings. Systems may involve or comprise a computing apparatus such as a computer or mobile communication device of a user, such as a recipient of a bill or person or entity adding highlighting to a bill or invoice.

Systems may involve one or more or all of computing apparatus of a recipient of a bill, source of a bill, intermediary that performs processing of a bill on behalf of a source, and a financial institution utilized for electronic payment of the bill in embodiments in which electronic payment is made through a financial institution instead of directly through a merchant or source of a bill). For example, a system may comprise only a mobile communication device or a computing apparatus configured or operable to execute certain steps or processes involving one or more or all of highlighting, acquiring an image and processing the image according to embodiments, a mobile communication device and a recognition system such as an optical character recognition system, a mobile communication device and a payer computer, or only a payer computer configured or operable to execute certain steps or processes involving one or more of highlighting, acquiring an image and processing the image according to embodiments.

System embodiments may involve one or more components operable for highlighting, imaging and processing of the bill. Systems may involve a computer of a source of a bill such as when a merchant or financial institution highlights a bill for its customer so that the customer can employ embodiments with a mobile communication device or computing having an image capture component without the need to manually highlight the bill.

In a single or multiple embodiments, extraneous data such as color indicators or data, such as an added highlight or modification, is transparent such that the underlying alphanumeric or other data is visible or readable through the highlight mark or modification using a process such as optical character recognition. The color may, for example, be fluorescent pink, blue, green (including lime green), cyan, yellow, orange or purple, and shades or variants thereof. One manner in which such color marks or highlights may be manually applied to the bill is by use of a marking instrument such as a felt-tip highlighter pen or marker.

Embodiments may involve manual highlighting by a payer or bill recipient, by a merchant or source of the bill or by an intermediary that processes bills in behalf of a merchant or source and that is in communication with the payer or bill recipient. Thus, the bill recipient may manually mark, color or highlight a bill with a marking instrument and/or computing apparatus, or the bill recipient may receive a bill already marked by the payee for the convenience of the user.

In a single or multiple embodiments, document processing involves processing of a bill or invoice. Bill or invoice processing involves an image including one or multiple manually colored or highlighted sections or fields, and one or multiple unhighlighted sections or fields.

Colored or highlighted fields may include one or more fields or combinations thereof such as fields required to complete an electronic bill payment, which may involve information such as one or more or all of a payee identification, payee address, account number, payment amount, and payment due date, or other data or combinations thereof needed for bill processing.

In a single or multiple embodiments, the user such as a bill recipient may not know some or all of the sections or fields that are to be highlighted. In these instances, a computing apparatus implementing embodiments may receive a request for sections of the paper bill to be manually highlighted, look up or determine which sections are to be manually highlighted for bill processing (e.g., for a particular type of bill or for a particular merchant), and send a reply back to the user with the requested information.

One manner in which a bill or invoice is processed involves an electronic bill payment or bill pay, which involves communicating the determined bill data together with authorization or instructions to complete the electronic bill payment from a payer's account through a network to a computer of a financial institution hosting the account and that executes the instructions. Electronic bill payment may be made directly to the merchant or indirectly through a financial institution.

In a single or multiple embodiments, determining the bill data involves masking of the image while leaving colored or highlighted sections or fields unmasked. For example, one embodiment involves masking unhighlighted sections of the image, identifying the at least one unmasked and highlighted section within the masked image and extracting bill data from the at least one identified unmasked and highlighted section. One manner in which masking is performed is based on the different colors of a bill's background and alphanumeric data. One method involves determining a first color of a background of an uncolored or unhighlighted section of the paper bill, determining a second color of alpha-numeric data within the paper bill, and generating an electronic mask having a color being based at least in part upon the first color and the second color (e.g., the darker of the two colors, or a third color that is darker than the two colors). The generated electronic mask covers the unhighlighted sections while the highlighted sections remain unmasked. Thus, for example, if a bill background is white while printed text and numbers are black, the electronic mask may be black to black out everything except for the highlighted sections. The colors of the alphanumeric data can be based on one or more types of alphanumeric data, and the background color can be determined based at least in part upon color data of pre-determined sections or groups of pixels within the image (e.g., corners of the image).

In a single or multiple embodiments, determining the bill data involves counting or identification of a pre-determined minimum number of contiguous or adjacent pixels in the image having a color that differs from a background color of the image. The background color can be determined by analyzing colors of pixels or groups of pixels in the corners or other locations of the image. The pixels are read, color data is determined, compared with the background, and a highlighted section or field is identified based at least in part the comparison and determining that a pre-determined minimum number of pixels has a color or color data different than the background color. Bill data is then extracted from the identified section or field.

In a single or multiple embodiments, bill processing involves electronic bill payment utilizing any suitable payment method and payment of any suitable account such as a credit card, merchant or utility bill by transfer of funds between accounts of a financial institution, transfer of funds between financial institutions, transfer of funds from a financial institution to a merchant or other payee.

BRIEF DESCRIPTION OF THE DRAWINGS

The foregoing and other aspects of embodiments are described in further detail with reference to the accompanying drawings, wherein.

DETAILED DESCRIPTION OF ILLUSTRATED EMBODIMENTS

Embodiments relate to processing documents such as a bill or invoice utilizing an extraneous color data or modification such as an added color or highlight that is not essential or pertinent to the bill or invoice or data thereof. An image of the colored or highlighted bill is acquired, and the colored or highlighted section subsequently analyzed for processing. One embodiment involves processing a highlighted bill or invoice for electronic or on-line bill payment.

Figure 1:
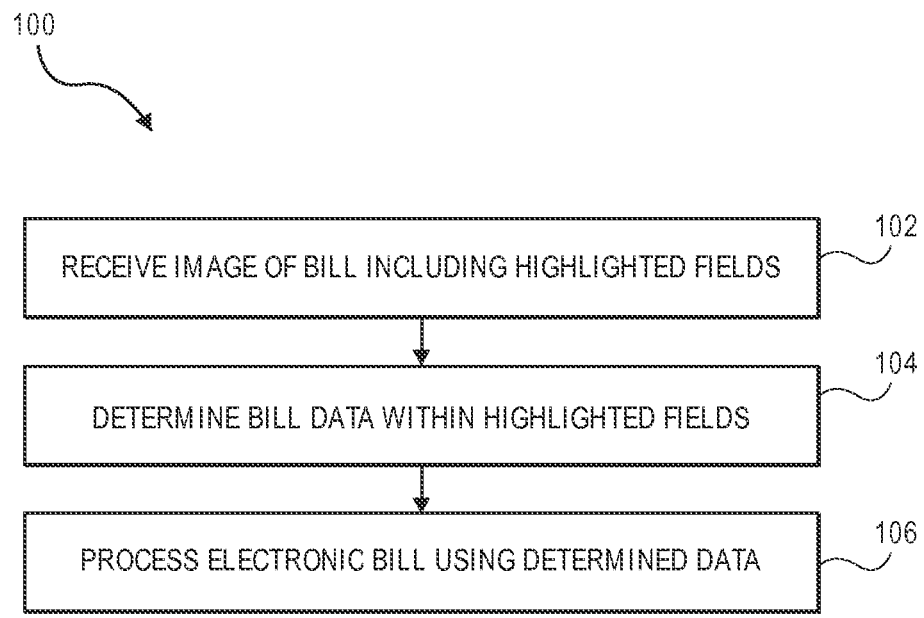
FIG. 1 is a flow diagram illustrating one embodiment of a method for processing a bill utilizing coloring or highlighting added to the bill.

For example, referring to FIG. 1, one embodiment of a method 100 for processing a document in the form of a bill or invoice (generally, "bill") involves a computing apparatus receiving an image of the bill including one or more colored or highlighted fields at 102, and at 104, the computer determining bill data within the colored or highlighted field(s). At 106, the bill is processed using the determined data, and processing may be for electronic payment of the bill or providing the bill or colored or highlighted information thereof to payer's accountant or other bill processor. While certain embodiments are described with reference to a bill and bill processing, it will be understood that embodiments may be applied to other documents and associated processing including financial documents in the form of negotiable instruments such as checks and other printed and electronic documents. Embodiments and further aspects thereof are described in further detail with reference to FIGS. 2A-15.

Figure 2A:
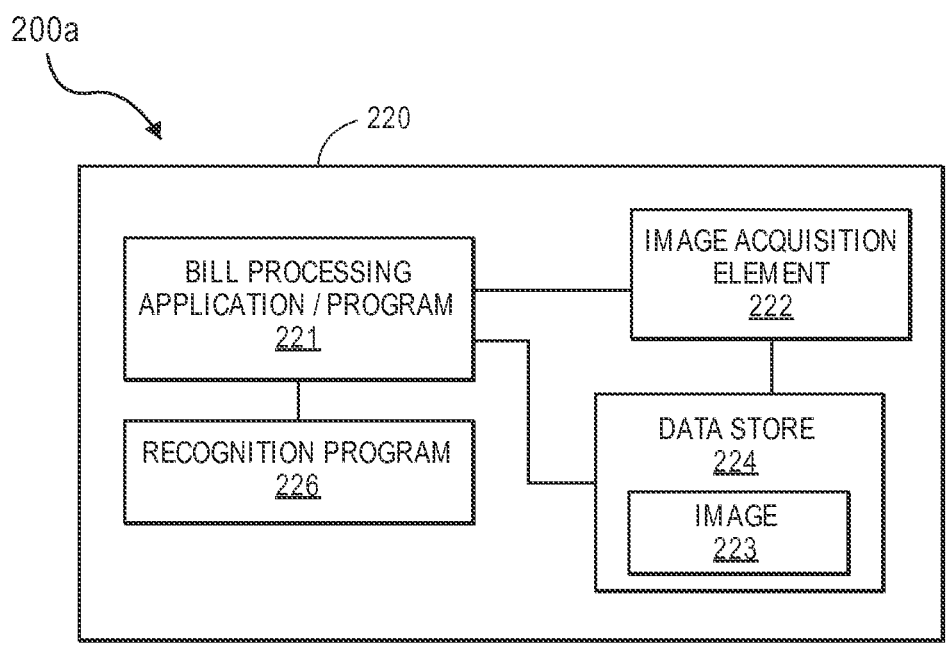
FIG. 2A is a block diagram of a system in the form of a mobile communication device or computing apparatus configured according to embodiments for processing a bill utilizing bill coloring or highlighting.
Figure 2B:
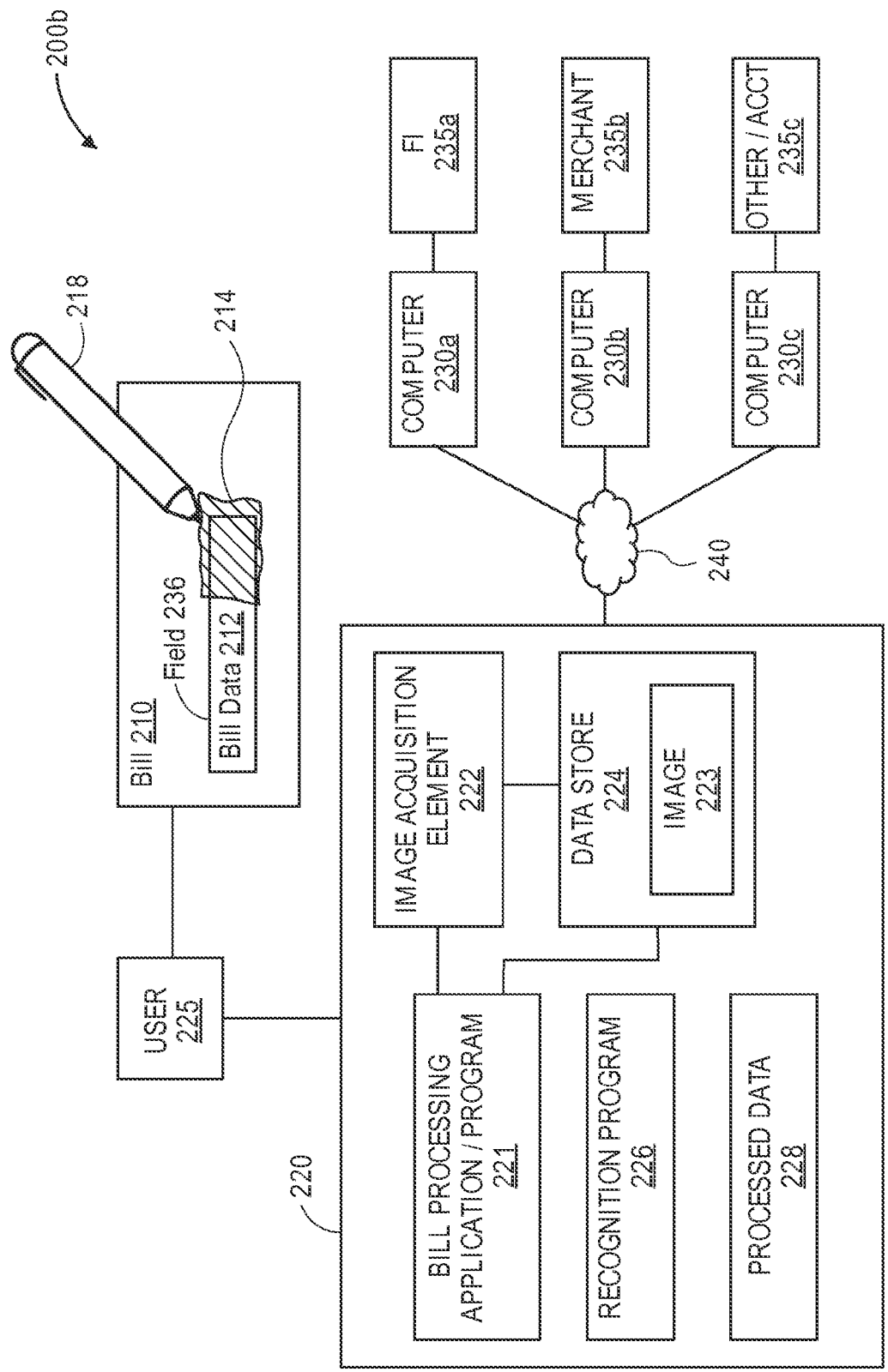
FIG. 2B is a block diagram of a system showing a mobile communication device or computing apparatus configured according to embodiments for processing a bill utilizing coloring or highlighting and in communication with one or more other computers utilized for bill processing.

Referring to FIGS. 2A and 2B, systems 200a and 200b constructed according to embodiments comprise or involve one or more components for processing a bill 210, or embody or execute instructions of an article of manufacture or computer program product for processing the bill 210. In the systems 200a and 200b, a computer, computing apparatus, computer component or mobile communication device 220 (generally, device 220) is operable by a user 225 to execute a bill processing or analysis program or application 221 (generally, bill processing program 221). As shown in FIG. 2B, the device 220 may be in communication through one or more networks 240 with one or more computers 230a-c (generally, computer 230).

The device 220 may be a device of or utilized by the user 225 such as a bill recipient, payer, or accountant 235c that manages the user's finances. Embodiments may involve various computers, computing apparatus, computing components, mobile communication devices 220 including a smartphone, tablet computing device or other computing or mobile device capable of wireless or cellular communications or components thereof. For ease of explanation, reference is made to device 220.

The device 220 may communicate with a computer 230a of a financial institution 235a ("FI" in FIG. 2B), which may process electronic bill payment on behalf of the user 225 such as the payer to a payee such as a merchant 235b. This may involve use of funds or credit of the user's account such as a checking, savings or credit card account hosted by the FI 235a. The device 220 may communicate with a computer 230b of the merchant 235b in cases in which payment is made directly to the merchant 235b rather than through the FI 235a to the merchant 235b. The device 220 may also communicate with a computer 230c of an accountant 235c or other processor of the bill 210 that manages financial matters such as bill payments on behalf of the user 225. It will be understood that there are various ways in which the bill may be processed, and these forms of bill payment and processing are provided as examples of how embodiments may be utilized.

FIG. 2B generally illustrates a system in which device 220 can communicate with one or more computers 230a, 230b, and 230c, but it will be understood that embodiments may involve communications with one or multiple such computers, and although not illustrated, such computers may communicate with each other through respective networks, such as network 240, such as when payment is made from funds transferred from an account hosted by the FI computer 230a to the merchant computer 230b. Example network 240 that may be utilized for communications between system components may wired and wireless or cellular networks, and include, but are not limited to, a Local Area Network (LAN), a Wide Area Network (WAN), Metropolitan Area Network (MAN), a Wi-Fi network, and other suitable networks capable of transmitting data, and a combination one or more or networks. For ease of explanation, reference is made generally to a network 240, but embodiments may involve various networks, combinations thereof, and respective communications systems, and protocols.

In the illustrated embodiments, the device 220 includes an image acquisition element 222 such as a camera or video recording component that typically include one or more optical components and one or more processing components. The image acquisition element 222 may be integrated within the device 220 or a separate device from which an image can be transferred or transmitted. The image acquisition element 222 is operable to acquire images and/or video 223 of the bill 210 embodying bill data 212 and a modification 214 to the bill 210, as described in further detail below.

Embodiments may involve an image 223 acquired with an image acquisition element 222 in the form of a camera, an image or a frame of an image 223 acquired with an image acquisition element 222 in the form of a camera or video component, or a screen shot or crop of an image 223 displayed on a computer. For ease of explanation, reference is made generally to an image 223 acquired with an image acquisition element 222 in the form of a camera of the device 220, but it will be understood that an image 223 (or video) may be acquired with an image acquisition element 222 of or integrated within the device 210 or with an image acquisition element 222 that is different and separate from the device 220.

Referring to FIG. 2B, the image acquisition element 222 includes an optical component such as a lens and associated controllers or processors for acquiring, processing and storing the image 223 in memory, data store or database 224 (generally, data store 224). As described in further detail below, the image 223 includes extraneous data, shown as modification 214, and generally illustrated as an add-on or mark to the image 223 of the bill 210. This modification 214 is provided to the bill processing program 221. The bill processing program 221 is operable to identify the bill data 212 of the bill 210 associated with or marked with the modification 214, e.g., underlying the modification 214 or within one or more sections or fields 216 (generally, field(s) 216) to which the modification 214 was completely or partially applied. This bill data 212 is provided to a recognition program 226, one example of which is an Optical Character Recognition (OCR) program, the output of which is processed recognized bill data 228 (generally, processed data 228) that is utilized for bill processing such as electronic bill payment.

Figure 3:
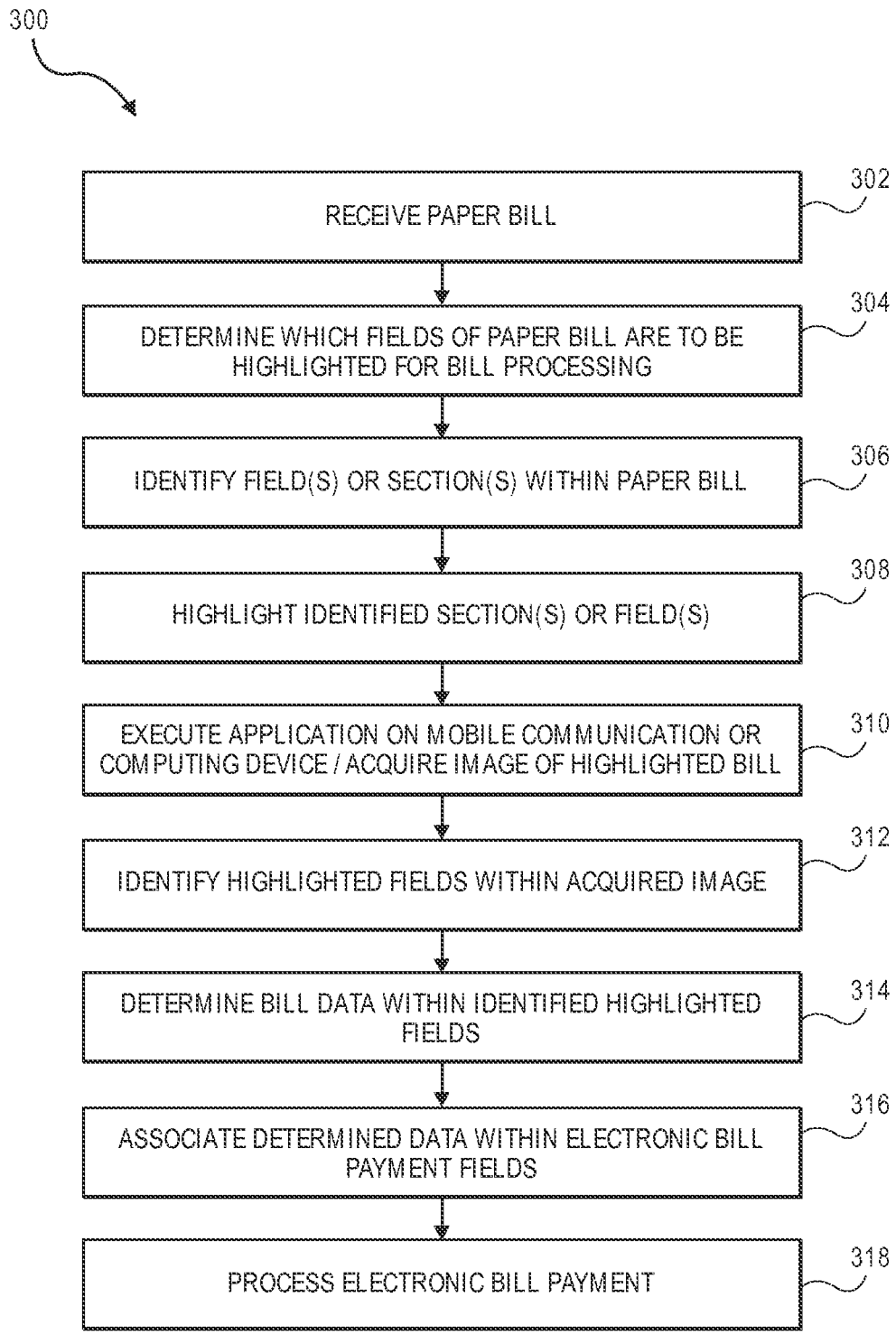
FIG. 3 is a flow diagram illustrating one embodiment of a method for processing a bill utilizing coloring or highlighting in which the coloring or highlighting is manually applied by a user.

Referring to FIG. 3, one embodiment of a method 300 for processing a bill 210 comprises or involves the payer receiving the bill 210 at 302. In one embodiment, the bill 210 is a paper bill, which is defined as including an original paper bill (e.g., received by mail), a printed version of the bill (e.g., a printed version of a bill sent by electronic mail), a faxed version of the bill, a paper copy of the bill or other physical copy or form of a bill whether originally created or transmitted in electronic or other form. For ease of explanation, reference is made generally to a bill 210 or paper bill, but it will be understood that embodiments may involve both paper and electronic bills and other documents for use in other processing applications.

Figure 4:
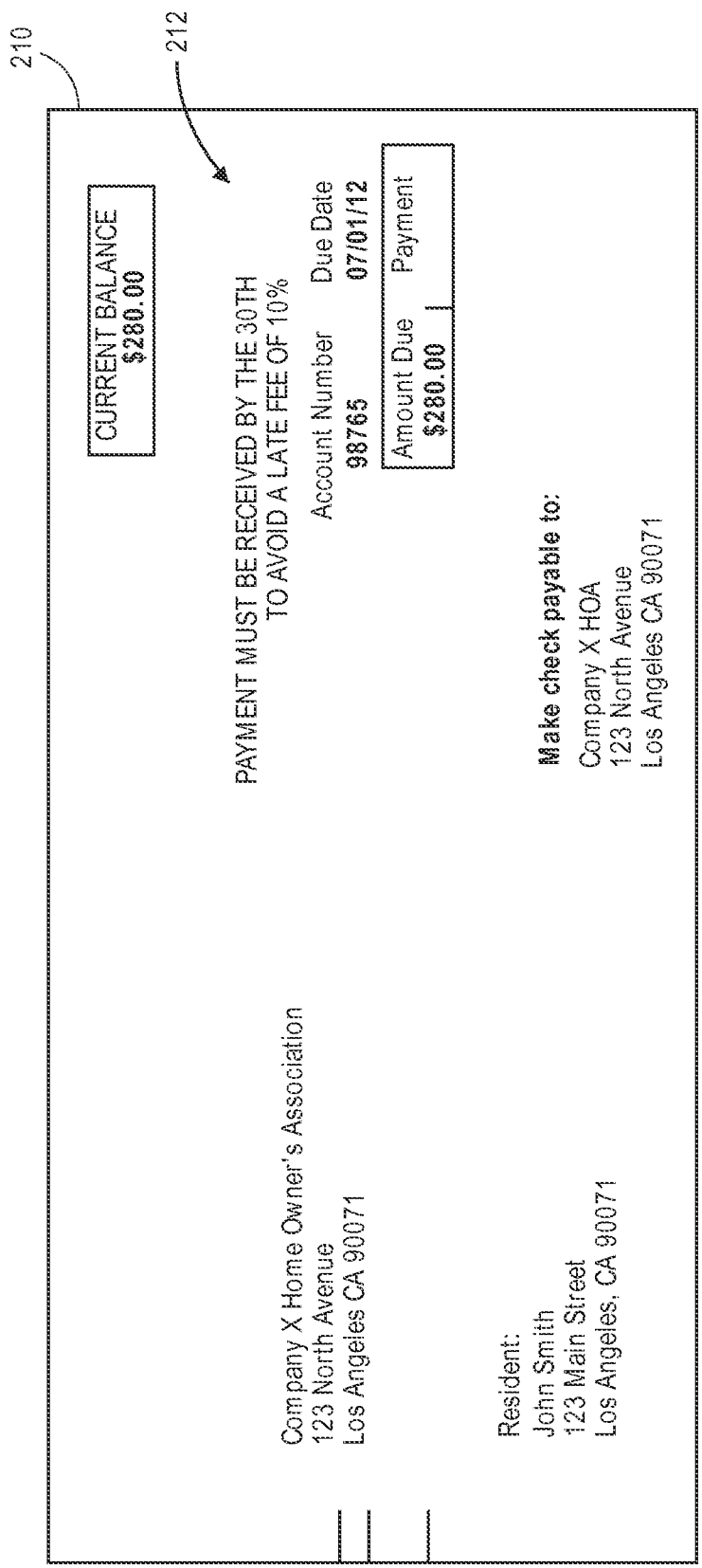
FIG. 4 shows an example of a bill that may be processed according to embodiments.

Referring to FIG. 4, one example of a bill 210 including bill data 212 that may be processed according to embodiments is shown. In the illustrated example, the bill 210 includes various types of alpha-numeric data (generally, bill data 212) such as the name and address of the payee and source of the bill, one or more account numbers, a bill amount or balance, a due date, check payment instructions, etc. in respective section(s) or field(s). Reference is made generally to bill data 212 within field(s) 216, but it will be understood that FIG. 4 is provided as a general example of a bill 210, and that different types of bills 210 contain different types of bill data 212 and different numbers of fields 216, and that some or all of such bill data 212 is needed to carry out electronic bill payment or other processing.

Referring again to FIG. 3, at 304, a determination is made regarding which bill data 212, or which field(s) 216 of the bill 210, are needed for bill processing. For this purpose, the user 225 may already know the required bill data 212 (e.g., from prior electronic bill payments), the information required may be standard for various financial institutions or merchants and may include a payee's name or account number, payer's name or account number, payment amount. The user 225 may contact a financial institution 235a, merchant 235b or other payee regarding which information should be provided.

Figure 5:
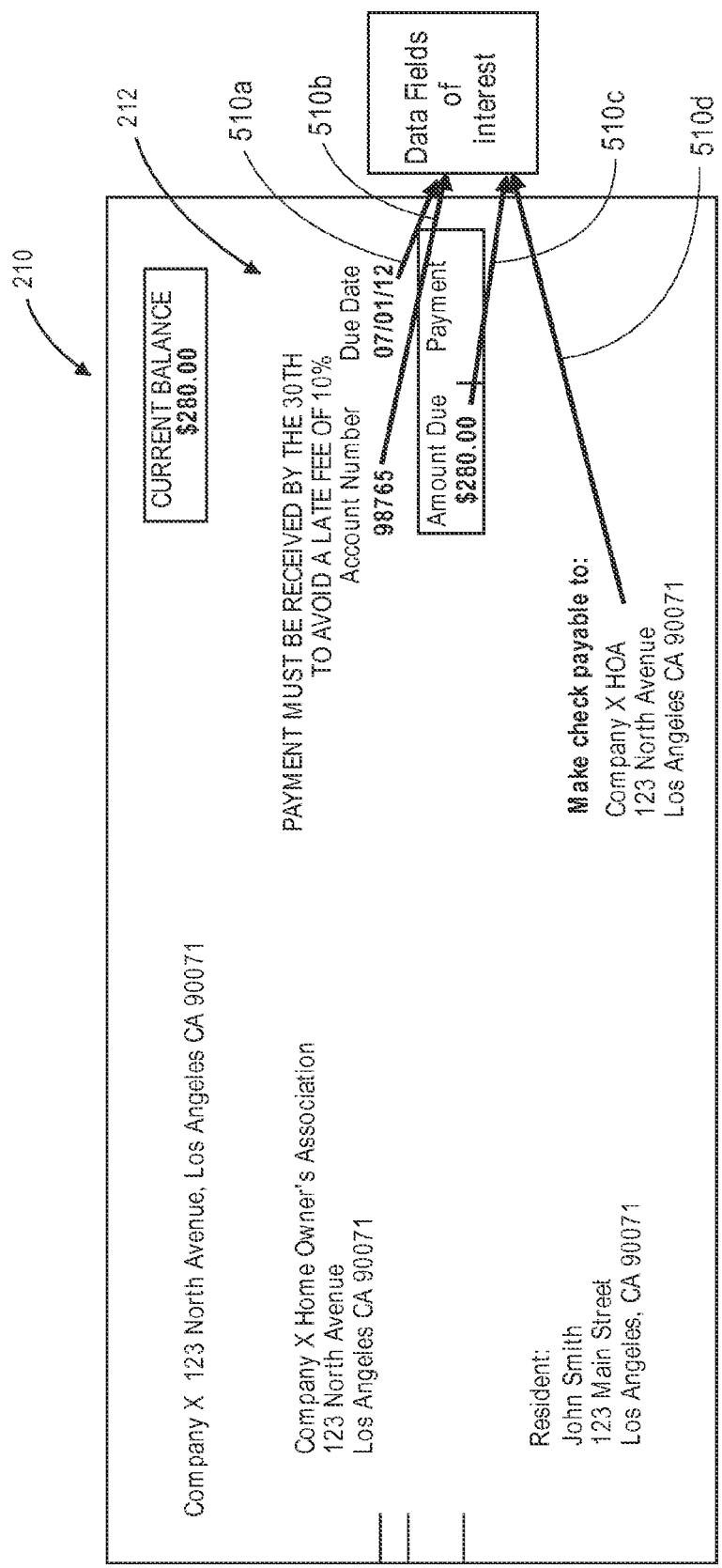
FIG. 5 shows the bill shown in FIG. 4 and identified bill data to be colored or highlighted for use in bill processing according to embodiments.

At 306, and with further reference to FIG. 5, the determined field(s) 216 or "data fields of interest" are identified within the paper bill 210 and highlighted at 308 ("h" referring to "highlighted" field 216. FIG. 5 provides an example of a Home Owners Association (HOA) bill, and shows that the following types of data are needed for bill processing: account number 510b, due date 510a, amount due 510c, and payee's name, address or other identification and contact information 510d. As noted above, it will be understood that the bill 210 and identified bill data 212 provided in FIG. 5 are provided as examples of one type of bill 210 to which embodiments may be applied. Thus, in the illustrated example, certain bill data 212 is needed for bill processing, whereas other bill data 212 is not.

Figure 6:
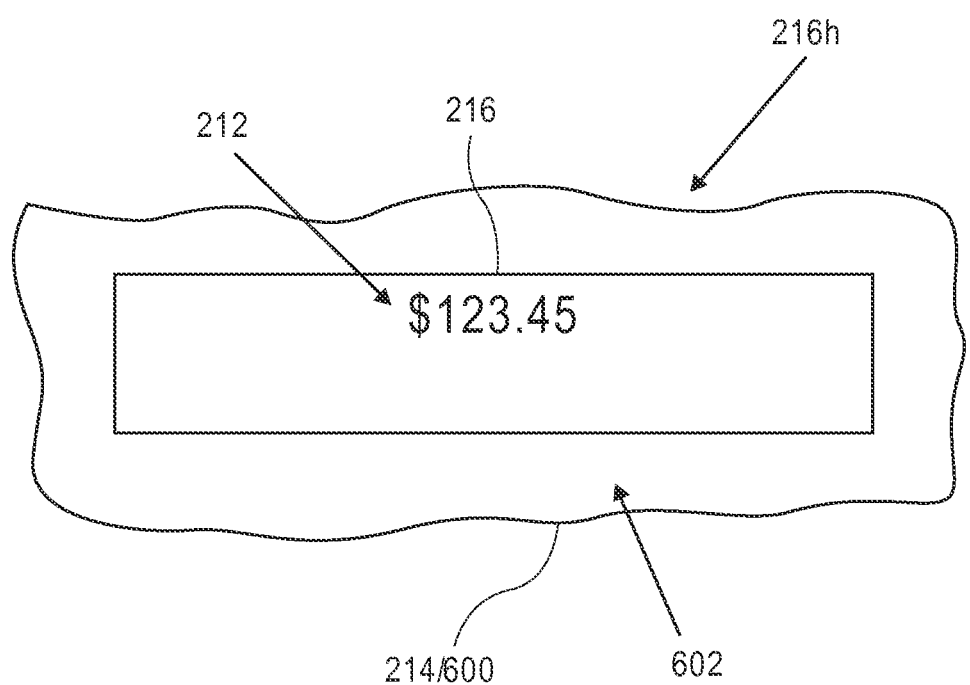
FIG. 6 generally illustrates fields of bill containing bill data being colored or highlighted.

Referring again to FIG. 3, and with further reference to FIG. 6, in one embodiment, step 308 involves application of extraneous data, modification 214, to the identified section(s) or field(s) 216. In the illustrated embodiment, this involves the user 215 manually applying extraneous data, modification 214, in the form of a highlight 600 to the identified field(s) 216.

Figure 7:
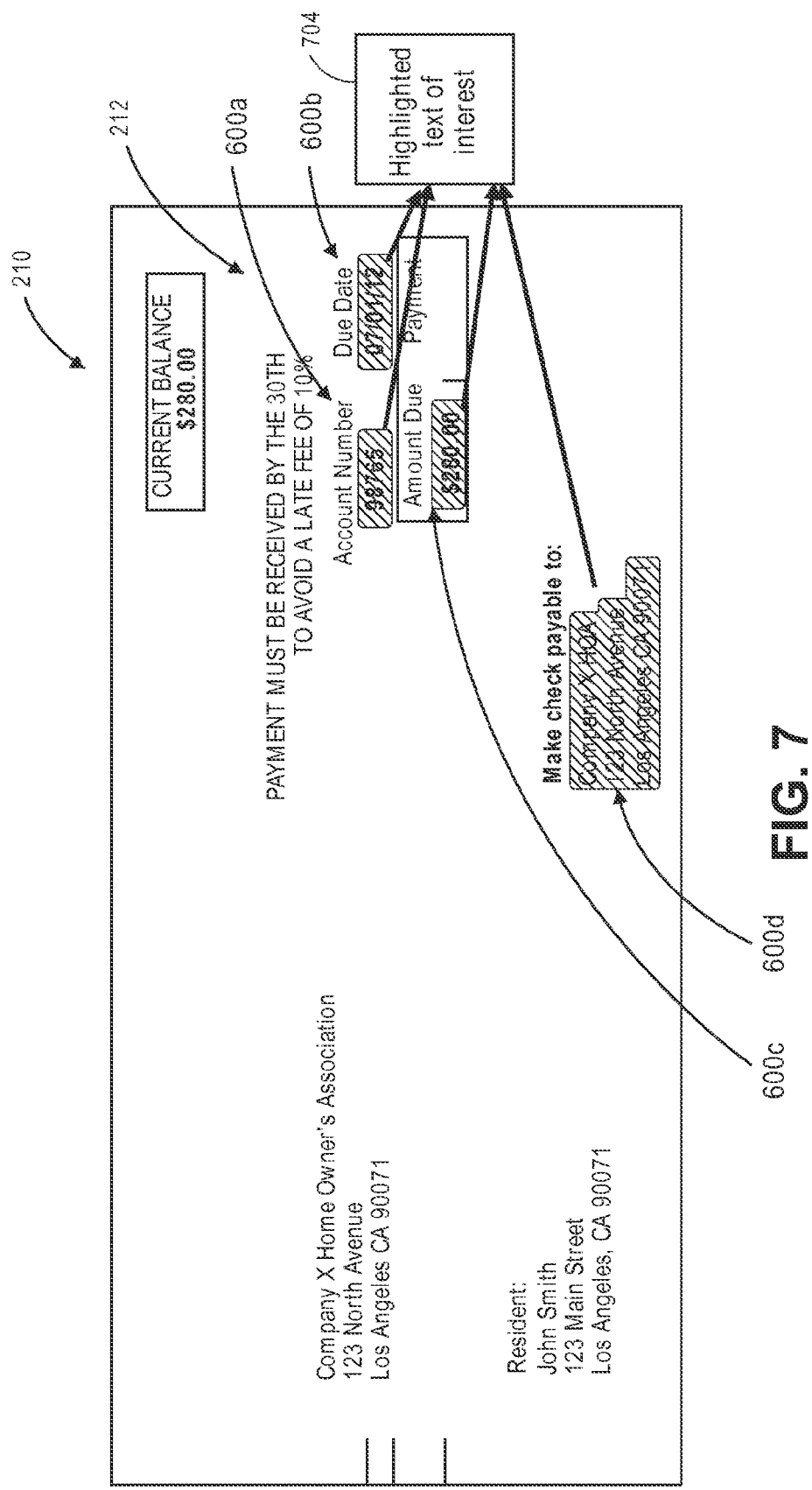
FIG. 7 shows the bill shown in FIG. 5 and the identified bill data being manually highlighted by the user for use in bill processing according to embodiments.

Referring again to FIGS. 2A, 2B, and 5-6, and with further reference to FIG. 7, in the illustrated embodiment, the identified field(s) 216 within the exemplary bill 210 is manually highlighted utilizing a marking instrument. One example of a marking instrument is a highlighter pen 218, which applies a colored ink to the paper bill 210. The highlight color 602 may, for example, be pink, blue, green, yellow, orange and purple, and other colors and shades or variants thereof such that the underlying bill data 212 remains visible or readable. The ink may be transparent and/or fluorescent.

In certain embodiments, the highlight 600 identifies the field(s) 216h while underlying highlighted bill data 212 remains visible or readable by the user 225 or by a system or program such as the recognition program 226. Application of the highlight 600 may be performed by the payee or user 225, by the source of the bill 210 such as a financial institution 235a or merchant 235b, which marks the bill 210 with the highlight 600 for the user's reference, or by another bill processor on behalf of or to facilitate bill processing for the user 225.

Other marking instruments for applying a color or highlight may also be utilized, and a highlighter pen 218 is provided as one example of how embodiments may be implemented. For example, in one embodiment, the marking instrument may also apply a clear or substantially clear layer of ink, or an ink layer that does not have a visible color, but which is otherwise detectable with the image acquisition element 222 or other detection device because of optical properties of the layer and/or capabilities of the image acquisition element 222. Thus, while the layer may not be visible to the human eye, optical properties of the layer may be such that it is visible or detectable by the image acquisition element 222.

In another embodiment, the marking instrument may be a wax-type layer, which may apply a thin colored or clear layer or wax to the bill 210, but through which the underlying bill data 212 can be read or detected as a result of the optical properties of the layer and/or capabilities of the image acquisition element 222. For example, the highlighter pen 218 may be a crayon or crayon-type marking instrument.

In another embodiment, the marking instrument is a label or label generator, and labels can be manually affixed to a section of the bill 210 over the bill data 212 while the underlying bill data 212 can still be read or detected as a result of the optical properties of the label and/or capabilities of the image acquisition element 222. For ease of explanation, reference is made to the highlighter pen 218, and field(s) 216h including respective bill data 212 being marked with respective highlights, as indicated by "highlighted text of interest" 704 as shown in FIG. 7, but it will be understood that embodiments may involve various types of marking instruments and resulting highlight indicators, which may or may not be color and which may or may not be visible or detectable to the human eye. A marking instrument is hereby defined as encompassing these and other marking instruments, and highlighting is hereby defined as including their resulting different markings or highlights.

With continuing reference to FIG. 3, at 310, the user 225 executes or launches the bill processing program 221 on the device 220, which employs the device's image acquisition element 222 to acquire an image 223 of highlighted bill 210. The image 223 may also be acquired by executing or launching the image acquisition element 222 first, and the user 225 may then identify or provide the image 223 as an input to the bill processing program 221, or the bill processing program 221 may scan acquired images from the data store 224 and request the user 225 to select or confirm the image 223 to be analyzed. In other embodiments, the image 223 may be acquired with an image acquisition element 222 of a computer, and downloaded or transmitted to the device 220 executing the bill processing program 221. Thus, it will be understood that the bill processing program 221 may execute on the same device utilized to acquire the image 223 or on a different device or computer, or be retrieved from a memory card or memory stick and downloaded or transmitted to the device 220. For ease of explanation, reference is made to the bill processing program 221 executing on the device 220 that is also utilized to acquire the image 223 of the highlighted bill 210.

Continuing with reference to FIG. 3, at 312, the bill processing program 221 analyzes the acquired image 223 to identify highlighted field(s) 216h. According to one embodiment, identification of highlighted field(s) 216h involves a masking method that masks or covers unhighlighted fields or sections for purposes of detecting the highlighted field 216h.

Figure 8:
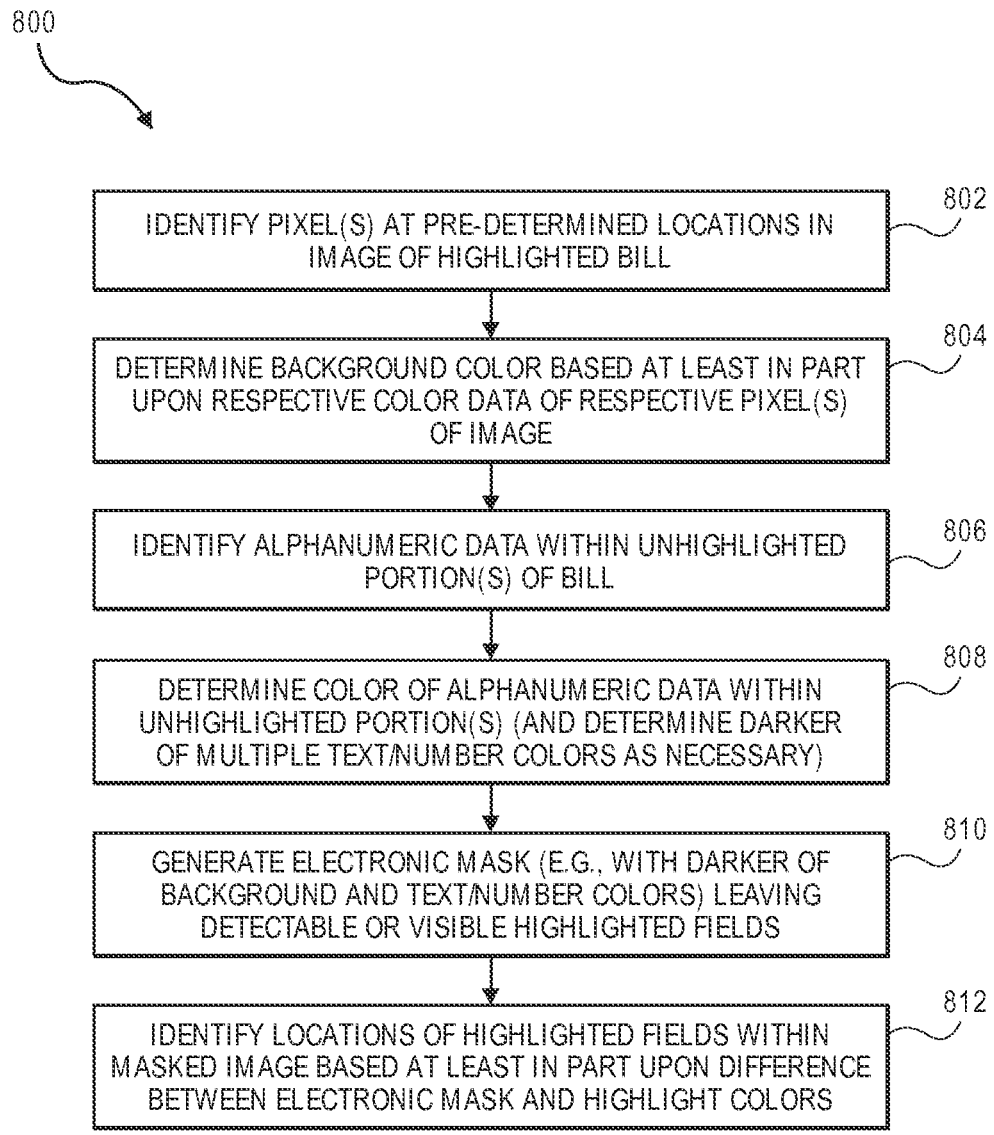
FIG. 8 is a flow diagram illustrating one embodiment for identifying colored or highlighted fields within an image of a bill and involving generation of an electronic mask applied to the image.
Figure 9:
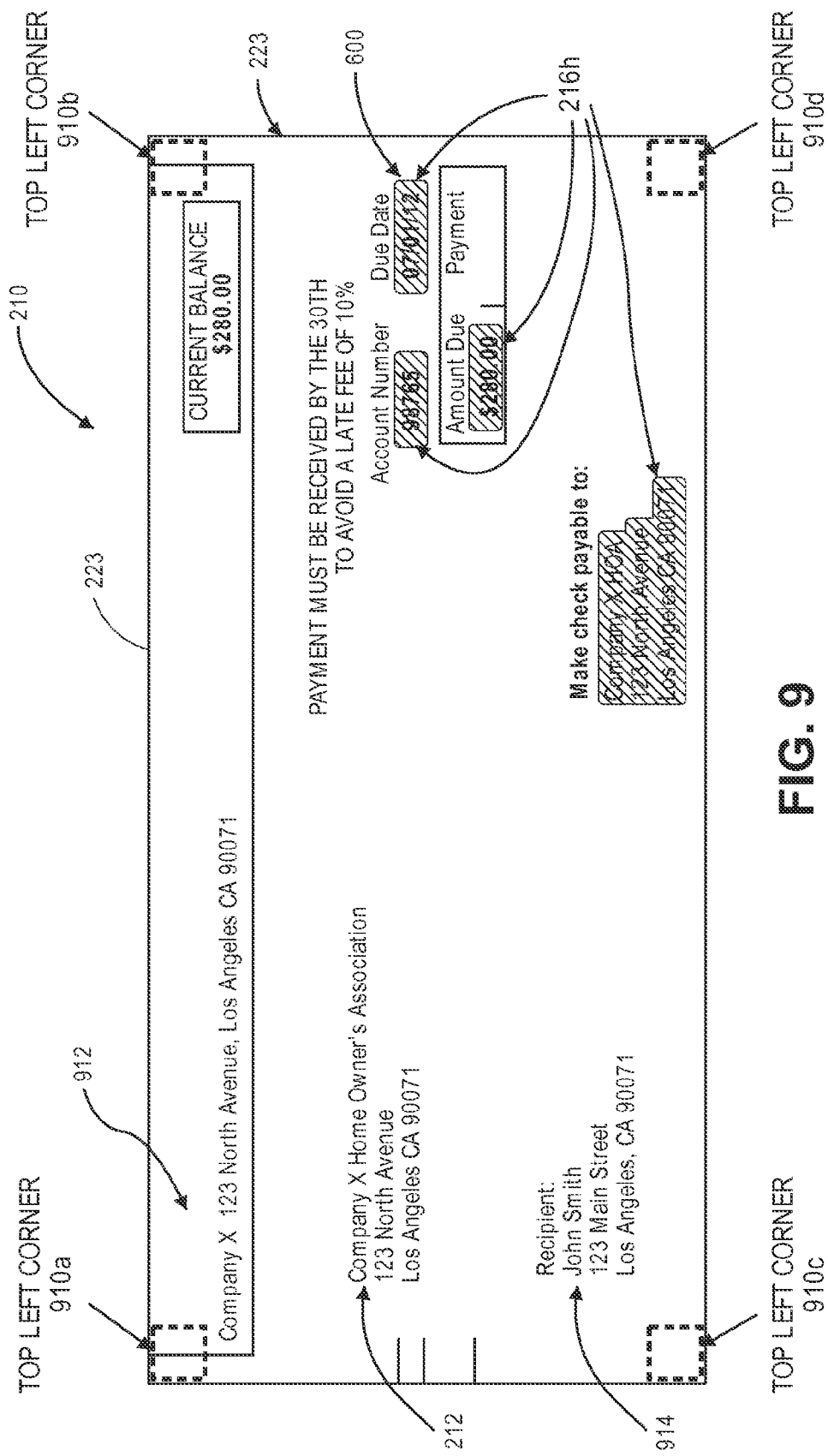
FIG. 9 illustrates one method for determining a reference or background color of a bill by analyzing color data of pre-determined sections of the bill for purposes of generating an electronic mask according to embodiments.

Referring to FIG. 8, and with further reference to FIG. 9, one embodiment of a method 800 for identifying highlighted field 216h within the highlighted bill 210 comprises or involves, at 802, the bill processing program 221 identifying pixel(s) at pre-determined locations within the image 223 of the highlighted bill 210. In the illustrated embodiment, the pre-determined locations are corners 910a-d of the image 223 (generally, pre-determined locations 910 of image 223). Each pre-determined location 910 analyzed may include one or multiple pixels, e.g., a 5×5 group of pixels, a 6×6 group of pixels, a 10×10 group of pixels, or other numbers and configurations or arrangements of pixels at the same or other pre-determined location determined to be representative or likely to represent a background color 912 of the bill 210.

Continuing with reference to FIG. 8, at 804, the bill processing program 221 determines the background color 912 based at least in part upon respective color data of respective pixel(s) at respective pre-determined locations 910. For example, the background color 912 may be determined utilizing or based at least in part upon, for example, the color of most of the pixels or groups of pixels, color data of a pre-determined number of the pixels or groups of pixels, an average color value or other criteria or color determination method. It will be understood that the background color 912 may be determined utilizing various color analyses.

Continuing with 806, the bill processing program 221 identifies bill data 212, which may be alphanumeric data within an unhighlighted field, and at 808, determines the color 914 of the alphanumeric bill data 212 within the unhighlighted field(s). If necessary, if bill data 212 includes multiple colors, the bill processing program 221 may also determine or select a darker color or the darkest color of multiple colors 914 of alphanumeric bill data 212.

Figure 10:
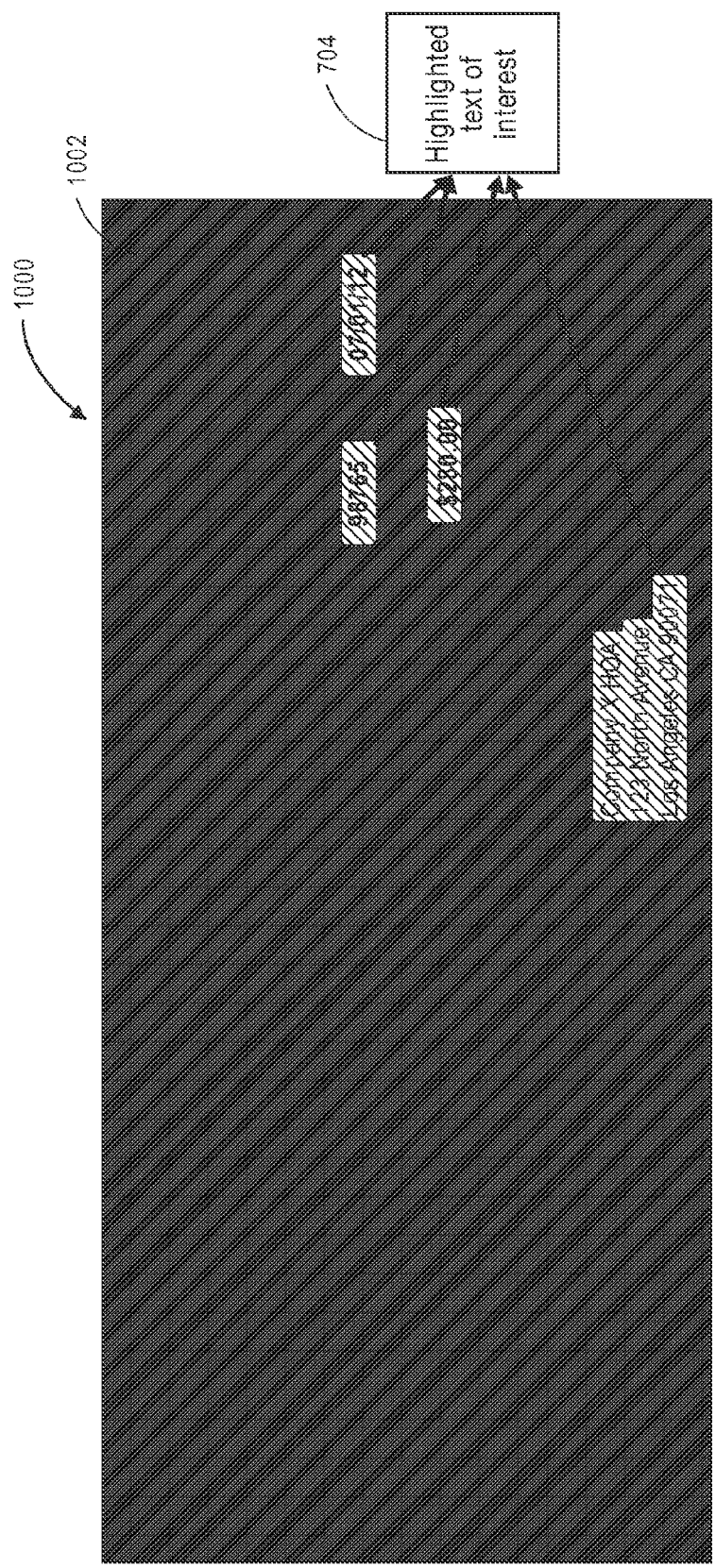
FIG. 10 illustrates how an electronic mask generated according to embodiments is applied to an image of a colored or highlighted bill.

Continuing with reference to FIGS. 7-8, and with further reference to FIG. 10, at 810, the bill processing program 221 generates an electronic mask 1000. According to one embodiment, the color 1002 of the electronic mask 1000 is the darker color of the determined background color 912 and the bill data or alphanumeric data color 914, thus leaving the highlighted field(s) 216 detectable, readable or visible. At 812, the bill processing program 221 identifies the highlighted field 216h location(s) (e.g., using an x-y pixel coordinate system or other suitable location method) within the mask 1000 based at least in part upon difference between color 1002 and the highlight color 602 of the highlight 600.

According to another embodiment, identification of highlighted field(s) 216h involves a pixel color comparison and counting method and identifying highlighted field 216h based at least in part upon identification of a certain number of pixels having different color than a reference or background color.

Figure 11A:
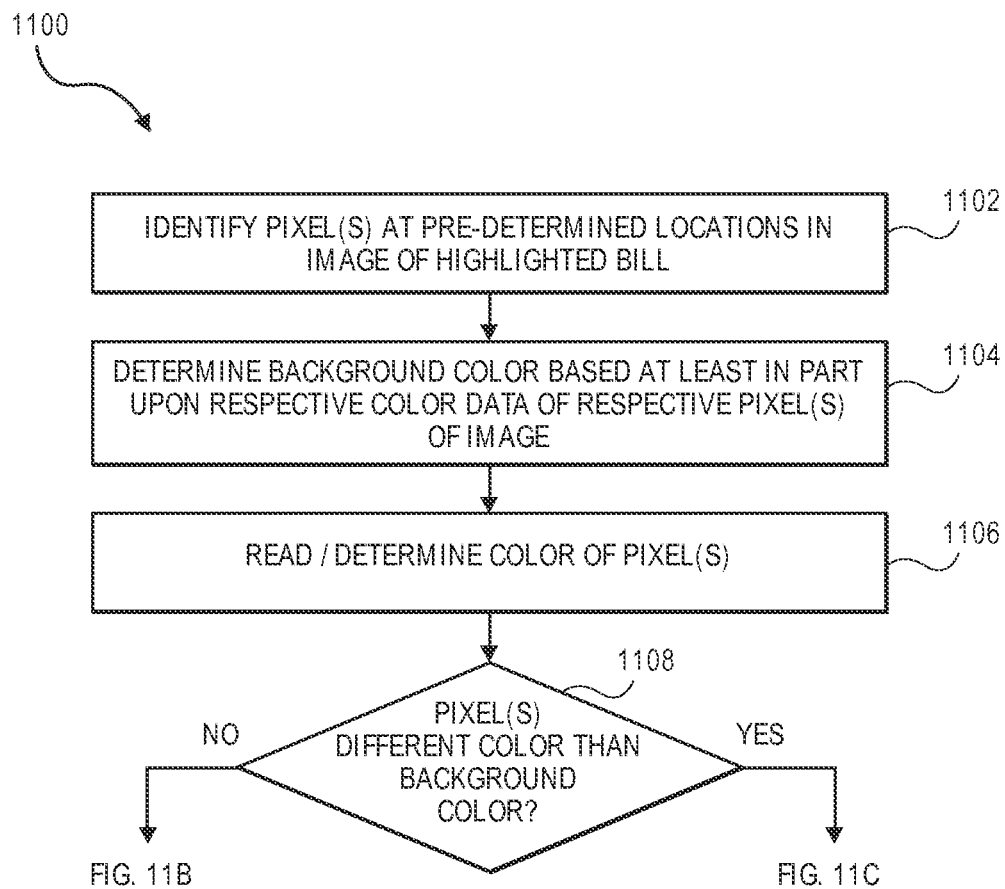
FIGS. 11A-C are flow diagrams illustrating embodiments for identifying colored or highlighted fields within an image of a bill and involving counting of pixels within an image of a colored or highlighted bill and comparison of pixel color data and background or reference data.
Figure 11B:
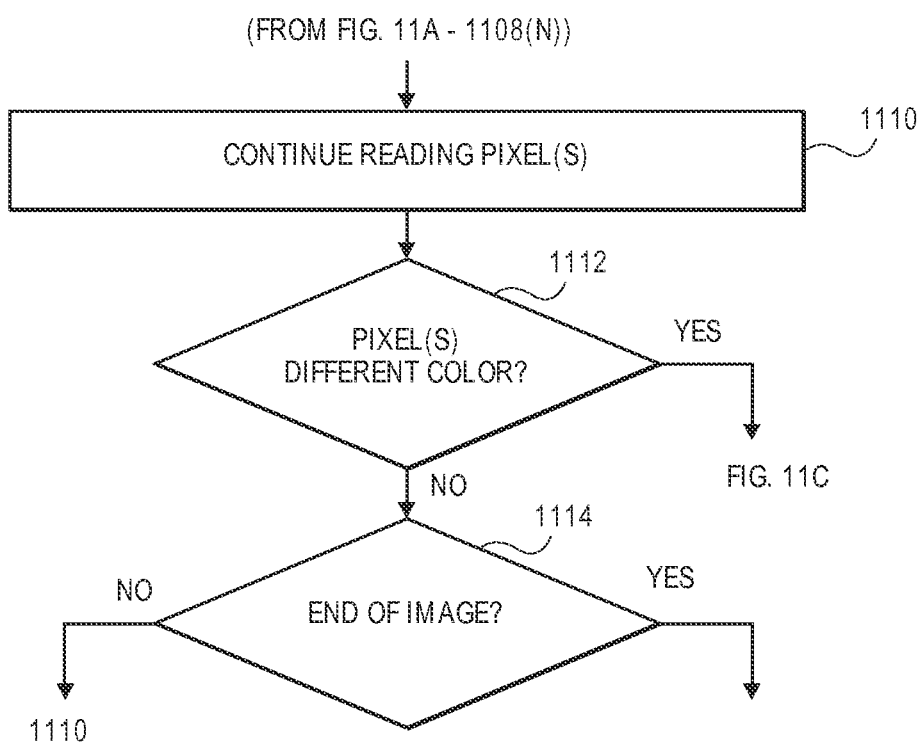
Figure 11C:
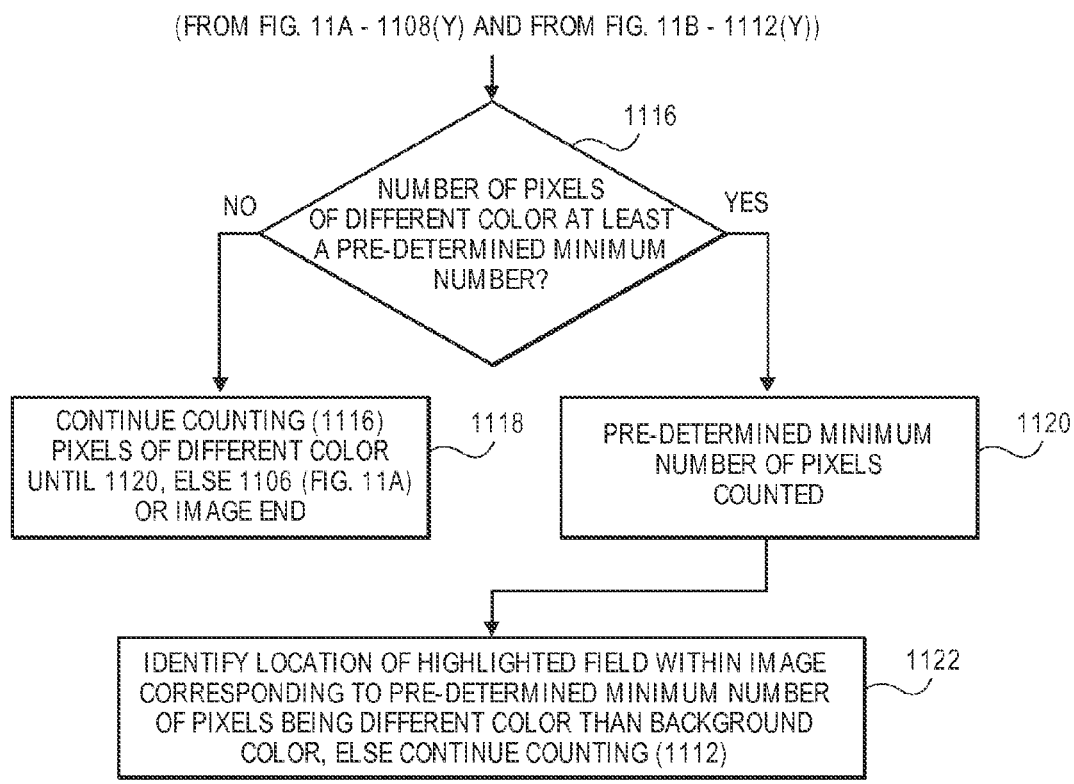
Figure 12:
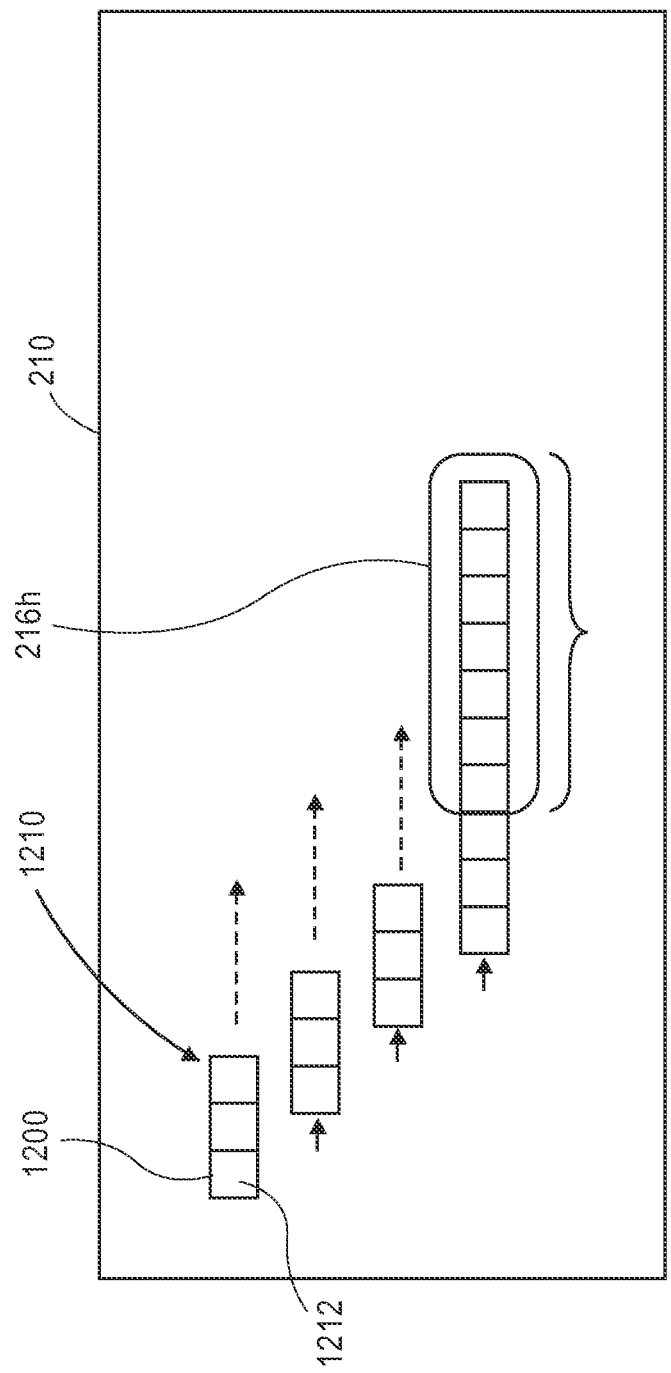
FIG. 12 further illustrates an embodiment in which pixels or groups of pixels within an image of a colored or highlighted bill may be counted in order to identify a colored or highlighted field within the image.

More particularly, FIGS. 11A-C and FIG. 12 illustrate one embodiment of a method 1100 for identifying highlighted field 216h within the image 223. Referring to FIG. 11A, the method 1100 involves, at 1102, the bill processing program 221 determining a background or reference color 912 (generally, background color 912) which, as discussed above, may involve identifying pixel(s) at pre-determined locations 910 in the image 223 of highlighted bill 210. With continuing reference to FIG. 11A and FIG. 12, at 1104, the background color 912 is determined based on respective color data of respective pixel(s) 1200 of the image 223. For example, this determination may be based on the color of most of the pixels 1200 or groups of pixels 1210 (generally, pixels 1200), color data of a pre-determined number of the pixels 1200 or groups of pixels 1210, an average color value or other criteria or color determination method. Further aspects thereof are described above and not repeated.

With continuing reference to FIG. 11A, and with further reference to FIG. 12, at 1106, the bill processing program 221 reads or scans pixels 1200 to determine respective colors or color data 1212 thereof. Step 1106 may involve starting from the top left corner or other pre-determined location 910 and scanning horizontal lines of pixels 1200.

At 1108, the bill processing program 221 compares the color or color data 1212 of the scanned pixels 1200 to the background color 912 and determines whether the scanned pixel color data 1212 is the same or different than the background color 912. Further processing can be implemented as needed for multi-colored bills, and may involve comparisons to a saved copy of a reference bill. If the pixel color data 1212 is the same as the background color 912 or only deviates from the background color 912 by a certain or small amount, then the method 1100 proceeds to FIG. 11B. If the pixel color data 1212 is different than the background color 912 or different by a certain amount, then the method proceeds to FIG. 11C.

Referring to FIG. 11B, if the bill processing program 221 determines that the pixel color data 1212 is the same as the background color 912 or only deviates from the background color 912 by a certain or small amount, then the method 1100 proceeds with 1110 to continue scanning pixels 1200 and at 1112, for these newly scanned pixels 1200, determining whether the scanned pixel color data 1212 is the same or different than the background color 912. If the bill processing program 221 determines that the pixel color data 1212 is the same as the background color 912, or only deviates from the background color 912 by a certain amount, then the method 1100 proceeds to 1114 to determine whether the end of the image 223 has been read or scanned. If so, then the method 1100 ends, else the method 1100 continues with further scanning at 1110.

With continuing reference to FIG. 11B, if step 1112 results in the scanned pixel color data 1212 being different than the background color 912, then the method 1100 proceeds to FIG. 11C. FIG. 11C further illustrates the method 1100 assuming a determination has been made at 1108 (FIG. 11A) or 1112 (FIG. 11B) that the scanned pixel color data 1212 is different than the background color 912 or different by a pre-determined minimum amount or degree.

With continuing reference to FIG. 11C, if the bill processing program 912 determines that the scanned pixel color data 1212 is different than the background color 912, or identifies a different colored pixel after scanning background pixels, then at 1116, the bill processing program 221 counts the different colored scanned pixels 1200 and determines whether the count number is at least a pre-determined number. If the count number is less than the pre-determined number, then the bill processing program 221 continues to scan pixels 1200 if further pixels 1200 remain, else proceeds to 1106 if additional parts of the image 223 are to be scanned, or if the end of the image 223 has been reached, the method 1100 ends and the user 225 can be notified.

Continuing with 1120, if the count number if at least the pre-determined number, then the method 1100 proceeds to 1122 to identify a pre-determined minimum number of adjacent or contiguous pixels of the highlight color 602 or a color that differs substantially from the background color 912 thereby identifying the location of the highlighted field 216h within the image corresponding to that pre-determined minimum number of pixels 1200 of a different color.

While embodiments involving masking and pixel counting in order to identify a highlighted field have been described, it will be understood that other methods may be utilized, and that both the masking and pixel count methods may be used together sequentially or simultaneously according to other embodiments. Accordingly, masking and pixel counting are provided as examples of how step 312 in FIG. 3 may be implemented by the bill processing program 221 to identify highlighted field 216 within the image 223.

Referring again to FIG. 3, at 312, the bill processing program 221 selects or crops the highlighted field 216h at the identified location within the image 223. At 314, the bill processing program 221 determines the bill data 212 within the identified highlighted field 216h, and at 316, extracts, reads or determines the bill data 212 within the selected or cropped highlighted field 216h and determines fields or sections of a web page or form for processing the bill 318, e.g., for on-line bill payment, linked to or associated with the respective bill data of the highlighted field 216h.

Figure 13:
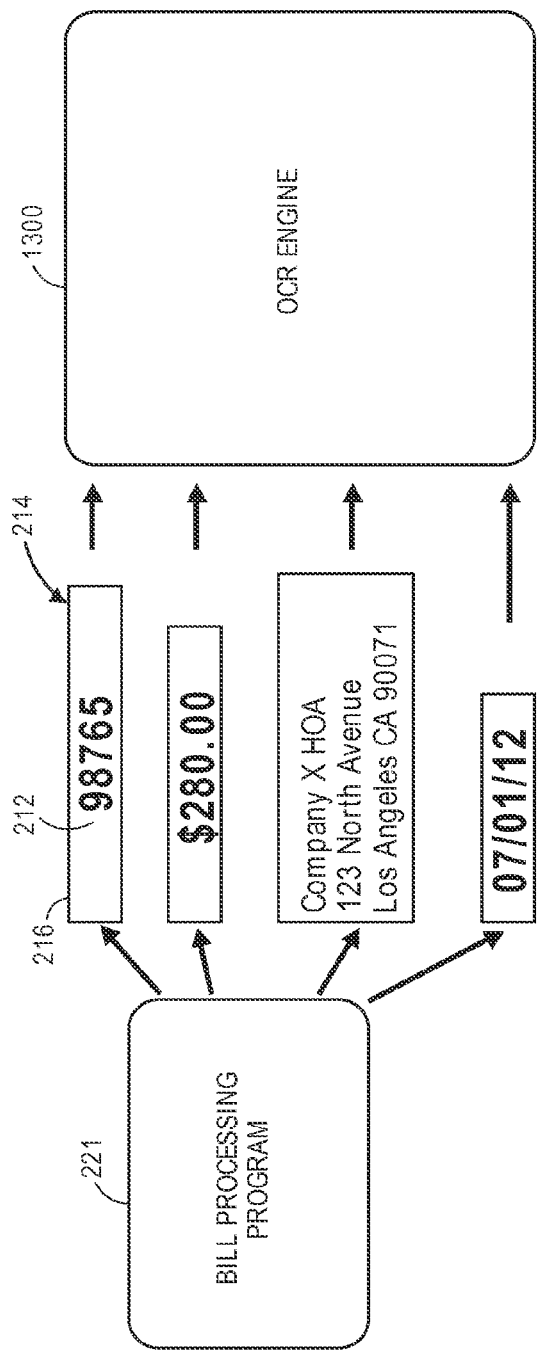
FIG. 13 illustrates how identified colored or highlighted fields are provided to a recognition program to extract the alpha-numeric bill data from the colored or highlighted fields.
Figure 14:
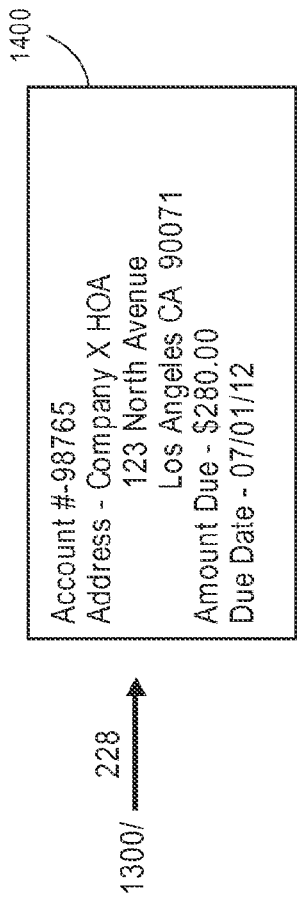
FIG. 14 shows how extracted bill data is associated with a field for a type of electronic processing such as an electronic bill payment.

For example, referring again to FIGS. 2A-B, and with further reference to FIGS. 13-14, the bill processing program 221 may provide alphanumeric bill data 212 read from the highlighted field 216h to the recognition program 226 such as an OCR engine or program 1300 or other program for converting alphanumeric bill data 212 in the image 223 into text that can be read, edited and further processed by the bill processing program 221. In the illustrated embodiment, four highlighted fields 216h were manually highlighted and identified by the bill processing program 221, and these selected or cropped highlighted fields 216h are output to the recognition program 226.

In the illustrated example, four highlighted fields 216h are for account number (98765), a bill amount (280.00), address or name of the payee (Company X Home Owner's Association, 123 North Avenue, Los Angeles, Calif. 90017) and due date (07/01/12). The extracted bill data 212 is then associated with a record or field type 1400 for the bill processing or electronic bill payment (which may be specified by a financial institution 235a or merchant 235b) to be performed such that the bill processing or electronic bill payment can then be completed using the extracted bill data 212 associated with respective bill processing fields.

While one example of how embodiments may be implemented have been described with reference to four highlighted fields 216h (account number, amount, payee identification/address and due date) are manually highlighted, identified and bill data 212 therein extracted for bill processing, it will be understood that embodiments may involve other numbers of highlighted fields 216h, e.g., one, two, three, five, six, seven and other numbers of highlighted fields 216h. The types and numbers of fields 216h to be highlighted may depend on the types of information required for different types of bill processing, one example of which is on-line or electronic bill payment, which may be made directly to the payee or merchant 235b, to a financial institution 235a, or indirectly to the payee or merchant 235b through a financial institution 235a.

Embodiments may be incorporated into a mobile or web application or other program that is native or downloaded to, executes on or by, or utilized in conjunction with the mobile communication device 220 or other computing apparatus. Further, embodiments may be incorporated into financial management systems or personal finance programs that collect bill data, used for bill processing, or used to interface with a financial institution for bill processing.

Further, bill processing or electronic payment may involve various types of payment transactions and payments made from various accounts including, for example, electronic check, credit card, debit card, electronic payment systems, automated clearing house (ACH), and other payment methods involving accounts such as credit card, savings, checking, money market, loan and other accounts, for payment of bills such as credit card bill, utility bill, phone bills, mortgage and other loan bills, home owners association bills, insurance bills, etc. Thus, it will be understood that embodiments may be utilized for various accounts, forms of payments and bills, and may be utilized in virtually any type of paper bill than can be manually highlighted to allow users to perform bill processing or payments from various locations at various types, and such capabilities are provided by embodiments through the use of a mobile communication device and a highlighter.

Figure 15:
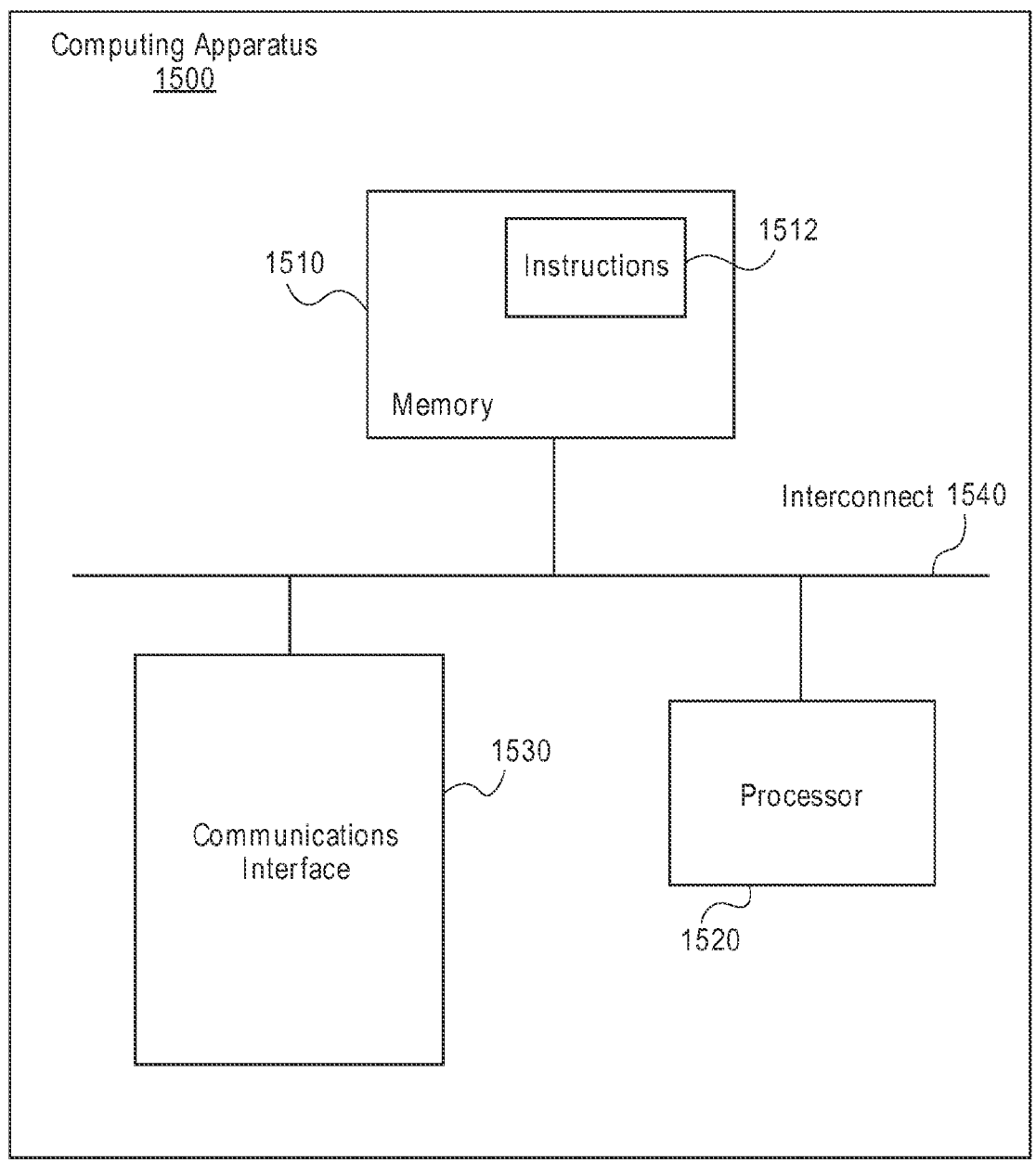
FIG. 15 is a block diagram of components of a computing apparatus or system in which various embodiments may be implemented or that may be utilized to execute various embodiments.

FIG. 15 generally illustrates components of a computing apparatus 1500 that may be utilized to execute embodiments including a memory 1510, account processing program instructions 1512, a processor 1520 to execute account processing program instructions 1512, a network or communications interface 1530, e.g., for communications with a network or interconnect 1540 between such components. The memory 1510 may be or may include one or more of cache, RAM, ROM, SRAM, DRAM, RDRAM, EEPROM, SDRAM and other types of volatile or non-volatile memory capable of storing data. The processor unit 1520 may be or may include multiple processors, a single threaded processor, a multi-threaded processor, a multi-core processor, or other type of processor capable of processing data. Depending on the particular system component (e.g., whether the component is a computer or a hand held mobile communications device), the interconnect 1540 may include a system bus, LDT, PCI, ISA, or other types of buses, and the communications or network interface may, for example, be an ethernet interface, a Frame Relay interface, or other interface. The network interface 1530 may be configured to enable a system component to communicate with other system components across a network which may be a wireless or various other networks. It should be noted that one or more components of computing apparatus 1500 may be located remotely and accessed via a network. Accordingly, the system configuration provided in FIG. 15 is provided to generally illustrate how embodiments may be configured and implemented.

Method embodiments may also be embodied in, or readable from, a non-transitory, computer-readable medium or carrier, e.g., one or more of the fixed and/or removable data storage data devices and/or data communications devices connected to a computer. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, DVD-RW, or other carrier now known or later developed capable of storing data. The processor 1520 performs steps or executes program instructions 1512 within memory 1510 and/or embodied on the carrier to implement method embodiments.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

For example, while embodiments are described with reference to an individual consumer, embodiments may also be applied to commercial or business consumers such that bills of individuals and enterprises can be paid through the use of a highlighter and a mobile communication device or computer with the ability to receive or acquirer an image of a highlighted bill.

Moreover, while certain embodiments are described with reference to a paper bill that is manually highlighted, embodiments may also involve displaying an electronic version of the bill on a screen and providing for computerized highlighting of the bill by manipulation of an input device of the computer. For example, embodiments may involve displaying the bill utilizing word processing software or browsers that allow for highlight simulation of fields or section of the displayed bill, e.g., using a highlighting program that allows users to attach highlighting to a web page viewed with certain web browsers. Further, while embodiments are described with reference to a document in the form of a financial document (such as a bill, invoice, negotiable instrument), embodiments may be applied to processing of other documents besides financial documents.

Moreover, while manual (or computer) highlighting is described as being performed by the end user (payer or customer), embodiments may also be executed or employed by other parties involved in the bill transaction or processing thereof. For example, a merchant such as utility or wireless communications company may employ manual or computerized highlighting of their bills and send the bills to the payers or customers. In this manner, the end user is not required to manually highlight the bill or scan the bill for computerized highlighting since the bill was already highlighted by the merchant for the customer's reference.

Additionally, embodiments may involve both manual and computer generated highlights of paper and electronic versions of a bill. For example, in cases in which one or more fields or sections of a paper or hardcopy bill or invoice were manually highlighted, but after the image was acquired, it was determined that additional highlighting was necessary. The partially highlighted section can be resolved by additional highlighting generated or executed by a computing apparatus or requested of the user to supplement manual highlighting and for the user take another image with the correct highlighting. Further, resolution may be in the form of requesting the user to repeat or complete highlighting of the partially highlighted section and may be based at least in part upon detection of a field or section that normally is a certain shape (e.g., rectangular) but detection by the bill processing program that highlighting was only applied to part of the rectangle (resulting in an open-ended rectangle).

Further, it will be understood that given the capabilities and user interaction of embodiments, electronic bill payments may be processed or completed utilizing only a highlighter and a mobile communication device, or only a mobile communication device in the event that the bill has already been highlighted, and that embodiments provide for processing of bills without having to manually enter bill or invoice data, e.g., into an electronic form or form in a web page, as part of an electronic payment to a merchant or financial institution.

Moreover, while various embodiments are described with reference to a mobile communication device embodying a bill processing program as well as a recognition program, it will be understood that a recognition program may also be utilized. Additionally, it will be understood that images may be acquired with a mobile communication device, stored to a data store of the mobile communication device or stored to an external data store or transmitted and stored to another computer or server, e.g., in the form of an electronic mail message for subsequent retrieval and processing.

While embodiments are described with reference to certain highlighters and resulting markings or indicators, it will be understood that other marking instruments may also be utilized. Further, while embodiments are described with reference to application of a highlight over bill data to highlight the actual bill data, in other embodiments, the bill processing program can be configured to detect a marking that is not applied over the bill data and then detect an adjacent field, and then extract the bill data from that field. For example, embodiments may be configured such that the user can use a marking instrument (which may or may not apply a transparent or clear marking) to apply a highlight dot to the left of a field of interest, and then the bill processing program is configured to detect that highlight dot, search for the field of interest to the right of the highlight dot, and then select or crop that detected field of interest, and provide the field to the OCR program to extract the bill data within that field. Thus, embodiments may involve highlighting actual bill data or pre-determined locations of the bill for use in locating fields of interest which are then processed according to embodiments described above.

Where methods and steps described above indicate certain events occurring in certain order, those of ordinary skill in the art having the benefit of this disclosure would recognize that the ordering of certain steps may be modified and that such modifications are in accordance with the variations of the invention. Additionally, certain of the steps may be performed concurrently in a parallel process when possible, as well as performed sequentially. For example, it will be understood that highlighting may be performed before an image is acquired (e.g., in embodiments involving manual highlighting), or performed after an image is acquired (e.g., in embodiments involving computer highlighting).

Accordingly, embodiments are intended to exemplify alternatives, modifications, and equivalents that may fall within the scope of the claims.

What is claimed is:

1. A computerized bill processing system, comprising:
   a computerized acquisition element configured to generate an image of a printed bill or invoice of a payer that is a recipient of the printed bill or invoice, the printed bill or invoice reflecting an amount owed by the payer recipient to a payee; and
   a bill processing application, in communication with the computerized acquisition element or a data store associated with the computerized acquisition element, and configured to:
      receive the image comprising at least one section manually highlighted by the payer recipient and at least one unhighlighted section,
      determine bill or invoice data within the at least one section that was manually highlighted by the payer recipient based at least in part upon identifying a pre-determined number of contiguous pixels in the image having a color that differs from a background color of the image; and
      process the bill or invoice for electronic payment by the payer recipient to the payee based at least in part upon the determined bill or invoice data within the at least one section that was manually highlighted by the payer recipient.

2. The computerized bill processing system of claim 1, the computerized acquisition element comprising:
   a lens; and
   a controller or processor configured to acquire the image utilizing the lens and to store the image to the data store.

3. The computerized bill processing system of claim 1, the computerized acquisition element comprising a component of a mobile communication device of the payer recipient.

4. The computerized bill processing system of claim 1, wherein the computerized acquisition element and the bill processing application are integrated within a single computing apparatus.

5. The computerized bill processing system of claim 4, wherein the single computing apparatus is a computing apparatus of the payer recipient.

6. The computerized bill processing system of claim 1, wherein the computerized acquisition element and the bill processing application are separate components of respective different computing devices.

7. The computerized bill processing system of claim 1, the computerized acquisition element comprising a camera.

8. The computerized bill processing system of claim 1, the computerized acquisition element comprising a video recording component, the image comprising a video frame generated by the video component.

9. The computerized bill processing system of claim 1, the image comprising a screen shot of an image displayed by a computing apparatus executing the bill processing application.

10. The computerized bill processing system of claim 1, the at least one manually highlighted section comprising a section manually marked with a transparent, fluorescent color.

11. The computerized bill processing system of claim 10, the transparent, fluorescent color being selected from the group consisting of pink, blue, green, cyan, yellow, orange and purple.

12. The computerized bill processing system of claim 1, the at least one manually highlighted section comprising a section manually marked by the payer recipient with a marking instrument comprising a highlighter pen.

13. The computerized bill processing system of claim 1, the at least one manually highlighted section comprising a section manually marked with a marking instrument comprising a wax marking instrument.

14. The computerized bill processing system of claim 1, the image further comprising at least one section manually highlighted by a source of the printed bill or invoice of the payer recipient.

15. The computerized bill processing system of claim 1, the image further comprising at least one section manually highlighted by an intermediary that receives an unhighlighted printed bill or invoice from a source and sends the highlighted printed bill to the payer recipient.

16. The computerized bill processing system of claim 1, the image comprising a plurality of manually highlighted sections, electronic payment of the printed bill or invoice being processed based at least in part upon respective bill or invoice data determined from the plurality of manually highlighted sections.

17. The computerized bill processing system of claim 16, at least one of the plurality of manually highlighted sections being selected from the group consisting of the payee name, a payment amount owed by the payer recipient to the payee, and a payment due date.

18. The computerized bill processing system of claim 1, the bill processing application being further configured to:
   receive a request for sections of the printed bill or invoice to be manually highlighted,
   determine which sections are to be manually highlighted for bill or invoice processing, and
   send a reply in response to the request, the reply identifying the determined sections to be manually highlighted.

19. The computerized bill processing system of claim 1, the bill processing application being configured to process the bill or invoice for electronic payment by being configured to communicate the determined bill or invoice data and electronic bill or invoice payment instructions from a computing apparatus executing the bill processing application through a network to a computer of a financial institution.

20. The computerized bill processing system of claim 1, further comprising an optical character recognition component in communication with the bill processing application, wherein the optical character recognition component is configured to determine the bill or invoice data.

21. The computerized bill processing system of claim 1, the bill processing application being configured to determine the bill or invoice data within the manually highlighted section by being configured to:
   mask unhighlighted sections of the image;
   identify at least one unmasked, manually highlighted section within the masked image; and
   extract bill or invoice data from the at least one identified unmasked, manually highlighted section.

22. The computerized bill processing system of claim 21, the bill processing application being configured to mask the unhighlighted sections by being configured to
   determine a first color of a background of an unhighlighted section of the printed bill or invoice;

determine a second color of alpha-numeric data within the printed bill or invoice;

generate an electronic mask, a color of the electronic mask being based at least in part upon the first color and the second color, wherein the electronic mask covers the unhighlighted sections while the manually highlighted sections remain unmasked.

23. The computerized bill processing system of claim 22, the color of the electronic mask being a darker color of the first color and the second color.

24. The computerized bill processing system of claim 22, the color of the electronic mask being a third color that is darker than both of the first color and the second color.

25. The computerized bill processing system of claim 22, the first color of the background being determined based on respective color data of respective pixels at respective pre-determined locations within the image.

26. The computerized bill processing system of claim 25, the pre-determined locations comprising respective corners of the image.

27. The computerized bill processing system of claim 1, the bill processing application being configured to determine the bill or invoice data by being configured to:
determine a background color of an unhighlighted section of the printed bill or invoice,
read pixels in the image,
determine respective color data of the pixels,
identify at least one manually highlighted section based at least in part upon determining that a pre-determined minimum number of read pixels has a color different than the background color, and
extract the bill or invoice data from the at least one manually highlighted section that was identified.

28. The computerized bill processing system of claim 1, wherein the bill processing application is configured to determine the bill or invoice data within the at least one manually highlighted section without reference to a database of bill or invoice templates.

29. The computerized bill processing system of claim 1, wherein a field of the bill or invoice containing bill or invoice data is partially highlighted, the bill processing application being further configured to:
resolve the partially highlighted field to identify a complete field that should have been highlighted; and
determine bill or invoice data within the identified complete field,
wherein the printed bill or invoice is processed based at least in part upon the determined bill or invoice data within the identified complete field.

30. The computerized bill processing system of claim 1, wherein the image is an image of a printed bill or invoice selected from the group consisting of a credit card bill, a utility bill, a phone bill, a loan bill, a home owners association bill, and an insurance bill.

31. A computerized bill processing system, comprising:
a computerized acquisition element configured to generate an image of a printed bill or invoice of a payer that is a recipient of the printed bill or invoice, the printed bill or invoice reflecting an amount owed by the payer recipient to a payee; and
a bill processing application, in communication with the computerized acquisition element or a data store associated with the computerized acquisition element, and being configured to:
receive the image comprising:
at least one section manually highlighted by an intermediary that receives the printed bill or invoice unhighlighted from a source and sends the manually highlighted printed bill to the payer recipient, and
at least one unhighlighted section;
determine bill or invoice data within the at least one section that was manually highlighted by the payer recipient based at least in part upon identifying a pre-determined number of contiguous pixels in the image having a color that differs from a background color of the image; and
process the bill or invoice for electronic payment by the payer recipient to the payee based at least in part upon the determined bill or invoice data within the at least one section that was manually highlighted by the payer recipient.

32. A computerized bill processing system, comprising:
a computerized acquisition element configured to generate an image of a printed bill or invoice of a payer that is a recipient of the printed bill or invoice, the printed bill or invoice reflecting an amount owed by the payer recipient to a payee; and
a bill processing application, in communication with the computerized acquisition element or a data store associated with the computerized acquisition element, and being configured to:
receive a request for sections of the printed bill or invoice to be manually highlighted,
determine which sections are to be manually highlighted for bill or invoice processing,
send a reply in response to the request, the reply identifying the determined sections to be manually highlighted,
receive the image of a printed bill or invoice of a payer that is a recipient of the printed bill or invoice, the printed bill or invoice reflecting an amount owed by the payer recipient to a payee, the received image comprising at least one section manually highlighted by the payer recipient and at least one unhighlighted section,
determine bill or invoice data within the at least one section that was manually highlighted by the payer recipient, and
process the bill or invoice for electronic payment by the payer recipient to the payee based at least in part upon the determined bill or invoice data within the at least one section that was manually highlighted by the payer recipient.

33. A computerized bill processing system, comprising:
a computerized acquisition element configured to generate an image of a printed bill or invoice of a payer that is a recipient of the printed bill or invoice, the printed bill or invoice reflecting an amount owed by the payer recipient to a payee; and
a bill processing application, in communication with the computerized acquisition element or a data store associated with the computerized acquisition element, and being configured to:
receive the image of the printed bill or invoice, the received image comprising at least one section manually highlighted by the payer recipient and at least one unhighlighted section,
determine bill or invoice data within the section that was manually highlighted by the payer recipient by being configured to mask unhighlighted sections of the image by determining a first color of a background of an unhighlighted section of the printed bill or invoice, determining a second color of alpha-numeric data within the printed bill or invoice, and generating an electronic mask, a color of the electronic mask being based at least in part upon the first color and the second color, wherein the electronic mask covers the unhighlighted sections while the at least one manually highlighted section remains unmasked, identify at least one unmasked, manually highlighted section within the masked image;

extract bill or invoice data from the at least one identified unmasked, manually highlighted section; and process the bill or invoice for electronic payment by the payer recipient to the payee based at least in part upon the determined bill or invoice data within the section that was manually highlighted by the payer recipient.

34. A computerized bill processing system, comprising:

a computerized acquisition element configured to generate an image of a printed bill or invoice of a payer that is a recipient of the printed bill or invoice, the printed bill or invoice reflecting an amount owed by the payer recipient to a payee; and a bill processing application, in communication with the computerized acquisition element or a data store associated with the computerized acquisition element, and being configured to:

receive the image of the printed bill or invoice, the received image comprising at least one section manually highlighted by the payer recipient and at least one unhighlighted section, wherein a field of the bill or invoice containing bill or invoice data is partially highlighted, resolve the partially highlighted field to identify a complete field that should have been highlighted;

determine bill or invoice data within the identified complete field, the printed bill or invoice being processed based at least in part upon the determined bill or invoice data within the identified complete field; and process the bill or invoice for electronic payment by the payer recipient to the payee based at least in part upon the determined bill or invoice data within the at least one section that was manually highlighted by the payer recipient.

* * * * *